US009491057B2

(12) United States Patent
Riedl et al.

(10) Patent No.: US 9,491,057 B2
(45) Date of Patent: Nov. 8, 2016

(54) TRANSMITTING DATA PACKETS IN A DATA NETWORK WITH A MULTIPLICITY OF NETWORK NODES

(71) Applicants: Johannes Riedl, Ergolding (DE); Matthias Scheffel, Unterhaching (DE)

(72) Inventors: Johannes Riedl, Ergolding (DE); Matthias Scheffel, Unterhaching (DE)

(73) Assignee: Siemens Aktiengesellschaft, München (DE)

( * ) Notice: Subject to any disclaimer, the term of this patent is extended or adjusted under 35 U.S.C. 154(b) by 53 days.

(21) Appl. No.: 14/195,232

(22) Filed: Mar. 3, 2014

(65) Prior Publication Data

US 2014/0254425 A1 Sep. 11, 2014

(30) Foreign Application Priority Data

Mar. 8, 2013 (DE) .................. 10 2013 204 042

(51) Int. Cl.
*H04L 12/24* (2006.01)
*H04L 12/751* (2013.01)

(52) U.S. Cl.
CPC ............. *H04L 41/12* (2013.01); *H04L 45/02* (2013.01)

(58) Field of Classification Search
CPC ..... H04L 41/12; H04L 45/124; H04L 45/00; H04L 47/10; H04L 45/26; H04L 47/2408; H04L 45/42; H04L 45/028; H04L 45/28; H04L 45/22
See application file for complete search history.

(56) References Cited

U.S. PATENT DOCUMENTS

| | | | |
|---|---|---|---|
| 2003/0161309 A1* | 8/2003 | Karuppiah | 370/392 |
| 2003/0165117 A1 | 9/2003 | Garcia-Luna-Aceves et al. | |
| 2007/0127474 A1* | 6/2007 | Mirtorabi et al. | 370/390 |
| 2007/0286069 A1 | 12/2007 | Xu | |
| 2009/0092064 A1* | 4/2009 | Fan et al. | 370/255 |
| 2009/0175194 A1* | 7/2009 | Akhter et al. | 370/254 |

(Continued)

FOREIGN PATENT DOCUMENTS

| | | |
|---|---|---|
| WO | WO0079730 A2 | 12/2000 |
| WO | WO2007053141 A1 | 5/2007 |
| WO | WO2013009831 A1 | 1/2013 |

OTHER PUBLICATIONS

German Office Action dated Oct. 16, 2013 for corresponding German Patent No. DE 10 2013 204 042.3 with English translation.

(Continued)

*Primary Examiner* — Jung-Jen Liu
(74) *Attorney, Agent, or Firm* — Lempia Summerfield Katz LLC

(57) ABSTRACT

Systems and methods for transmitting data packets in a data network comprising a multiplicity of network nodes are provided. A routing topology associated with a respective network node is ascertained, wherein the routing topology describes paths for forwarding data packets between the respective network node and each other network node in the data network on the basis of links between adjacent network nodes. A piece of routing information with the identification of the respective routing topology is produced and is stored in the respective network node. A data packet transmitted from a source network node to a destination network node specifies the identification of the routing topology to be used for the transmission, wherein each network node that forwards the data packet uses the routing information stored on each network node with the identification of the routing topology for the data packet.

18 Claims, 3 Drawing Sheets

(56) References Cited

U.S. PATENT DOCUMENTS

| | | | |
|---|---|---|---|
| 2009/0303904 A1* | 12/2009 | Liu et al. | 370/254 |
| 2010/0278069 A1 | 11/2010 | Sharma et al. | |
| 2011/0158085 A1* | 6/2011 | Aloush et al. | 370/225 |
| 2011/0231573 A1 | 9/2011 | Vasseur et al. | |
| 2013/0022042 A1 | 1/2013 | Vasseur et al. | |

OTHER PUBLICATIONS

European Search Report dated Mar. 14, 2014 for corresponding EP 14151090.9 with English translation.

Canadian Examination Search Report for Canadian Patent Application No. 2844945, dated Sep. 30, 2015.

German Office Action for related German Application No. 10 2013 204 042.3, mailed Dec. 22, 2015, with English Translation.

\* cited by examiner

TRANSMITTING DATA PACKETS IN A DATA NETWORK WITH A MULTIPLICITY OF NETWORK NODES

CROSS-REFERENCE TO RELATED APPLICATIONS

This application claims the benefit of DE 10 2013 204 042.3, filed on Mar. 8, 2013, which is hereby incorporated by reference in its entirety.

TECHNICAL FIELD

The present embodiments relate to transmitting data packets in a data network having a multiplicity of network nodes and also to a corresponding data network.

BACKGROUND

The prior art discloses various methods that are used in a data network to specify how data packets are forwarded from a source node to a destination node via intermediate network nodes. Particularly in the case of data transmission using the Internet protocol on the L3 layer of the OSI reference model, routing methods for forwarding IP data packets are known. The rules for forwarding are calculated by a routing protocol, such as the Open Shortest Path First (OSPF) method. By virtue of the interchange of signaling messages, the information about the topology of the data network is distributed in the data network, and each network node separately calculates the shortest path to each other network node or networks connected thereto on the basis of metrics or costs that have been allocated to the links between adjacent network nodes.

SUMMARY AND DESCRIPTION

The scope of the present invention is defined solely by the appended claims and is not affected to any degree by the statements within this summary. The present embodiments may obviate one or more of the drawbacks or limitations in the related art.

The aim in this case is for routing to be influenced such that data packets are forwarded along particular shortest paths in order to avoid overload situations. In the case of OSPF routing, appropriate metrics are used to stipulate the paths that are best suited to forwarding data packets. This influences the forwarding of the data packets indirectly, however, and all the data packets between two network nodes may follow the same path.

In order to control the forwarding of data packets on different paths, what is known as the MPLS (Multi-Protocol Label Switching) is known from the prior art. This is a network technology below the IP layer that is used to signal paths in the network. IP packets are associated with paths by placing a label in front of the IP header, where the label is evaluated on the intermediate nodes. Although this method allows particular routing paths to be specified, the method requires a complex separate protocol.

A method for transmitting data packets in a data network is provided that may be used easily and flexibly to configure paths for forwarding data packets between the network nodes.

The method is used for transmitting data packets in a data network having a multiplicity of network nodes. In act a) of the method, for a respective network node from at least some of the network nodes (and, in some embodiments, for a respective network node from at least two network nodes of the data network), a routing topology associated with the respective network node and having an explicit identification is ascertained, wherein the routing topology describes paths for forwarding data packets between the respective network node and each other network node in the data network on the basis of links between adjacent network nodes. Act a) may be performed using inherently known routing methods or routing protocols. In particular, the OSPF method mentioned at the outset may be used to determine shortest paths in the data network.

In act b) of the method, for the routing topologies ascertained in act a), in each case for each network node, a piece of routing information (e.g., in the form of a routing table) with the identification of the respective routing topology is produced and is stored in the respective network node. This routing information contains for each destination network node, which may be specified in a data packet that is to be sent by the respective network node, a piece of information that indicates the adjacent network node to which the data packet to be sent needs to be forwarded in the respective routing topology.

In accordance with act c) of the method, a data packet transmitted from a source network node to a destination network node specifies the identification of the routing topology to be used for the transmission, wherein each network node that forwards the data packet uses the routing information stored on the network node with the identification of the routing topology for the data packet.

The method may allow the stipulation of a particular number of routing topologies and routing information based thereon, so that data packets may be suitably forwarded using specific or different routing topologies depending on the application. In the course of the forwarding, the routing topology to be used for the transmission is specified in the relevant data packet in this case.

In one embodiment, the data packets are transmitted on the L3 layer of the OSI reference model in the data network. In particular, the transmission is effected on the basis of the Internet protocol. Preferably, Internet protocol IPv4 and/or IPv6 is used in this case. In the event of data transmission being effected on the basis of the IPv6 protocol, in each data packet the identification of the routing topologies to be used for the transmission is, in a further variant, specified in an extension header that is known from this protocol and, in some embodiments, in the hop-by-hop options extension header.

In a further embodiment, the ascertainment of the routing topologies involves, in the event of a plurality of different paths for forwarding data packets between the respective network node and a particular other network node being able to be determined, a predetermined criterion that is the same for each routing topology to be ascertained being taken as a basis for stipulating one of the plurality of paths as part of the routing topology.

Should the identifications of the routing topologies be values from an ordinal or cardinal scale with a greater-than/less-than relationship, the predetermined criterion described above may be embodied such that the different paths from network node to network node run through in the same direction (e.g., from the starting node to the destination node of the paths or vice versa). In this case, the network nodes of the different paths are compared with one another, wherein the occurrence of at least partially different network nodes involves the path with that network node from the at least partially different network nodes that has the associated routing topology with the smallest or largest identification being stipulated as part of the routing topology.

Nevertheless, any other criteria may also be stipulated that may allow explicit handling of a plurality of equivalent paths. When the OSPF method is used, the plurality of paths occur when paths have the same total metric or the same total costs.

In a further embodiment, in the event of a link occurring in all the routing topologies ascertained in act a), for a network node of the link, a further routing topology having an explicit identification that does not contain the link is ascertained. In a similar manner to the other routing topologies, the further routing topology describes paths for forwarding data packets between one network node of the link and each other network node in the data network on the basis of links between adjacent network nodes. The criterion according to which of the two network nodes of the failed link is assigned the further routing topology may be embodied in arbitrary fashion. By way of example, the network node having the smaller network address may be assigned the further routing topology. For the further routing topology too, for each network node, the routing information in accordance with act b) above is produced and is stored in the respective network node. In this case, a data packet may also specify the further routing topology as the routing topology to be used for the transmission. The variant of the method that has just been described ensures that a routing topology may be used for the forwarding of data packets that does not contain a failed link.

In a further embodiment, act a) is performed for all the network nodes of the data network. Nevertheless, act a) may also be performed just for some of the network nodes of the data network. In the event of the identifications described above being successive integers excluding zero, a corresponding portion of the network nodes may be determined by division by a prescribed integer. In this case, for all the network nodes of the data network, an identification is stipulated independently of whether a routing topology is ascertained for the network node in act a). Finally, the identifications are divided on an integer basis by a prescribed integer excluding zero and less than at least some and, in some embodiments, all the identifications, wherein the routing topology is ascertained for the relevant network node in act a) for a remainder of zero.

In the event of one or more links between adjacent network nodes in the data network having failed and/or having an inadequate transmission quality on the basis of one or more quality criteria, in a further variant, a source network node specifies, in a data packet to be transmitted, an identification of a routing topology that does not contain any of the failed links and/or of the links with inadequate transmission quality. This allows that the data transmission is effected using intact links.

Besides the method described above, an embodiment also relates to a data network having a multiplicity of network nodes for the transmission of data packets, wherein the network nodes are embodied to perform the method or one or more variants of the method described above.

An embodiment also includes a network node, wherein the network node is configured as a network node in the data network described above and is therefore a network node that may be used for performing the method.

DETAILED DESCRIPTION

Embodiments are described below using the example of a data transmission based on Internet protocol version 6 (IPv6). Other protocols, such as Internet protocol version 4 (IPv4), may also be used. For the transmission of data packets, the embodiment described here, in contrast to conventional IP routing, may involve a plurality of routing tables being stored in the relevant network nodes of the data network, as described in more detail below.

Figure 1:
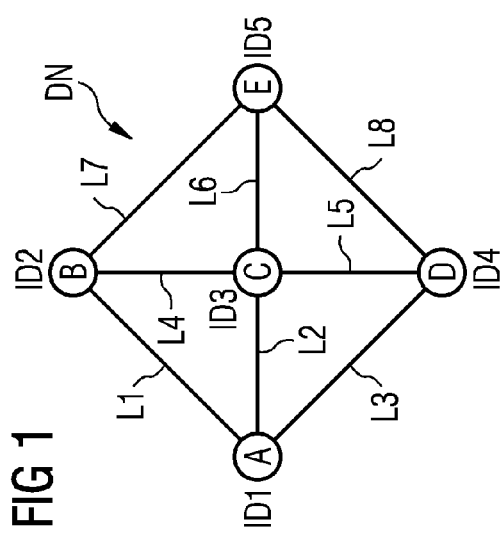
FIG. 1 depicts a schematic illustration of one embodiment of a data network.
Figure 4:
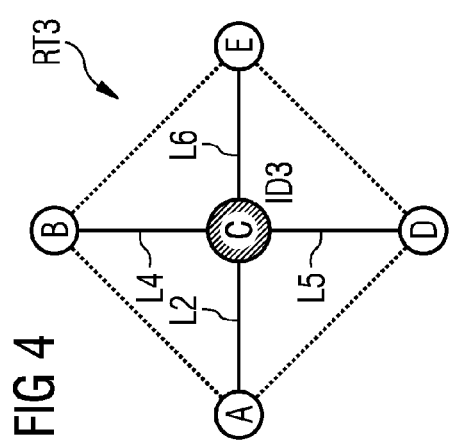

An exemplary embodiment of an IP-based data network DN is shown in FIG. 1. This data network includes five network nodes or routers A, B, C, D and E with appropriate IP addresses, wherein adjacent network nodes are connected to one another by appropriate links L1 to L8 in accordance with the topology of the data network. In the data network in FIG. 1, a spanning tree or a routing topology is determined for each individual network node of a plurality of network nodes in a manner known per se. Said routing topology is RT1 for network node A, RT2 for network node B, RT3 for network node C, RT4 for network node D and RT5 for network node E (see FIGS. 2-6). Each of the routing topologies RT1 to RT5 and hence each network node of the plurality of network nodes A to E has an associated corresponding identification from the identifications ID1 to ID5.

The determination of the routing topologies for the respective network nodes proceeds on the basis of the OSPF method. This method evaluates the known Dijkstra's algorithm in order to determine the shortest paths. In this case, appropriate metrics are stipulated for the individual links L1 to L8, with the path having the shortest total metric for the links contained therein being used for the transmission between a source node and a destination node. In the data network in FIG. 1, and also in the data network in FIG. 11 (described further below), all the links have the metric of 1. From the links, the OSPF method is used to obtain the routing topologies RT1 to RT5 shown in FIGS. 2-6 for the individual network nodes. In the individual routing topologies, the links that are contained in paths that are used for the transmission on the basis of the routing topology are shown by solid lines. Unused links are shown in dots. Each of the routing topologies RT1 to RT5 describes the transmission paths to be used from the relevant network node, with which the routing topology is associated, to each other network node of the data network. The network node associated with a routing topology is graphically highlighted in the respective FIGS. 2-6.

Figure 3:
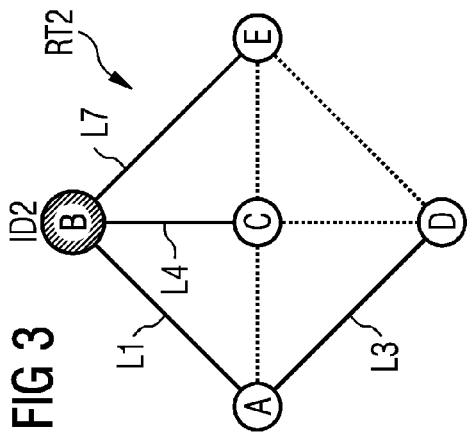
FIGS. 2-6 depict various routing topologies that are determined on the basis of the data network depicted in FIG. 1.
Figure 6:
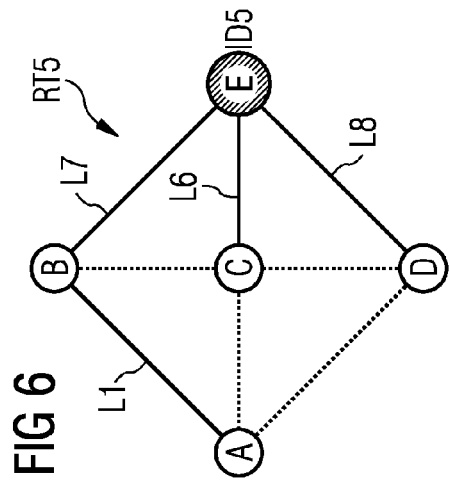
Figure 2:
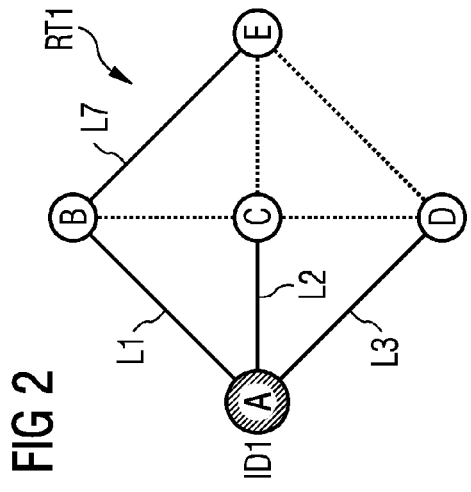
Figure 5:
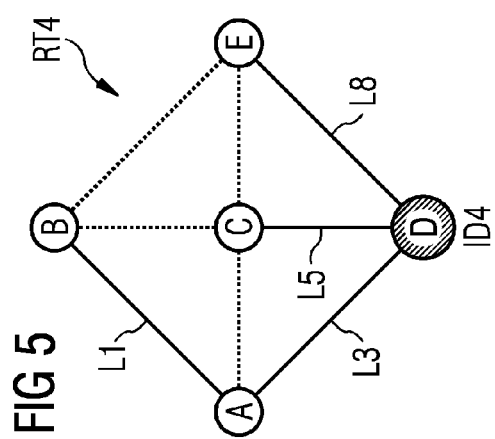

In the routing topology RT1 shown in FIG. 2, a data packet is transmitted from node A to node B via the link L1, from node A to node C via the link L2, from node A to node D via the link L3 and from node A to node E via the links L1 and L7. Similarly, corresponding paths are reproduced in the routing topologies in FIGS. 3-6 without the relevant paths being stated explicitly once again.

Following determination of the routing topologies RT1 to RT5, an appropriate routing table is in turn created for each routing topology of a plurality of routing topologies in a manner known per se, which routing table stipulates, for each destination node or each destination address in the data network starting from the network node that is associated with the respective routing topology, that next adjacent node to which the data packet needs to be forwarded from the network node associated with the respective routing topology. As shown in FIG. 2, the routing table therefore specifies forwarding to node B for destination node B, forwarding to node C for destination node C, forwarding to node D for destination node D and forwarding to node B for destination node E. In the latter case, the node in the routing table differs from the destination node, since the transmission path contains more than one link. Similarly, appropriate routing tables are generated for the routing topologies from FIGS. 3-6.

In the embodiment described here, additional routing tables are now generated for the respective nodes A to E on the basis of those routing topologies that are not associated with the respective network node. This is done by virtue of the routing topology associated with the respective network node being evaluated from the point of view of the other nodes and, as a result, a routing table being determined for each other node. Each routing table produced is specified in this case by identifying the routing topology from which the routing table has been generated.

For the purposes of clarification, the production of a routing table for node A on the basis of the routing topology RT2 is explained by way of example. In this case, node A, rather than node B, is considered to be the source node in the routing topology RT2. The result of this is that, on the basis of this routing topology, the path to node B runs via the link L1, the path to node C runs via the links L1 and L4, the path to node D runs via the link L3 and the path to node E runs via the links L1 and L7. On the basis of these specified paths, the relevant routing table is then generated. This contains the address of network node B for destination node B, the address of network node B for destination node C, the address of network node B for destination node E and the address of network node D for destination node D. Similarly, corresponding routing tables with the identification of the topology RT3 to RT5 are determined for network node A. In the same way, the relevant routing tables are also ascertained for the other network nodes by the routing topologies that are not associated with the other network nodes.

The determination of the routing topologies RT1 to RT5 also involves the stipulation of a standard criterion for how to deal with paths that have the same total metric. In this case, the criterion is the same for all the routing topologies in order to obtain explicit routing topologies and thereby to avoid loops during the data transmission. In the embodiments in FIGS. 1-6, the individual identifications ID1 to ID5 are values in rising order. In this case, the ascertainment of the paths using Dijkstra's algorithm involves the use of the rule that when there is ambiguity in the path the node that is selected is the one that is reached via the predecessor node with the lower identification in the routing table. This may be seen from FIG. 2, for example. There, the path via the links L1 and L7 has the same total metric as the path via the links L3 and L8. Since the identification ID2 of the routing topology RT2 associated with node B is less than the identification ID4 of the routing topology RT4 associated with node D, however, the path via the links L1 and L7 is selected. In the same way, the paths in the other topologies have been stipulated in the case of ambiguities. Nevertheless, in certain embodiments, other criteria for the explicit path selection may be stipulated. By way of example, the IP addresses of the nodes may be used. In this case, the path with the lowest sum of the IP addresses of its nodes may be included in the routing topology in the case of ambiguities.

The result is that the method described with reference to FIGS. 1-6 delivers five routing tables with the relevant identifications ID1 to ID5 for each network node. So as now to stipulate which of the routing tables needs to be used for a data packet to be transmitted, what is known as an extension header from the IPv6 protocol is used. This is clarified below with reference to FIG. 7.

Figure 7:
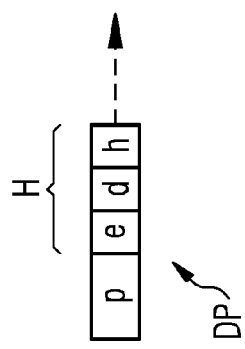
FIG. 7 depicts a structure of one embodiment of a data packet for transmission.

FIG. 7 shows a schematic illustration of a data packet DP based on Internet protocol IPv6. In this case, H denotes the header of the data packet. The inherently known portion of the header up to the destination address d of the data packet is referenced by the reference symbol h. In what is known as a next header field within the header section h, there is the stipulation that an extension header is used in the data packet DP. This header follows the destination address d and is denoted by the reference symbol e in FIG. 7. The extension header is adjoined by the payload p for the data packet.

In the embodiment described here, what is known as the hop-by-hop options extension header is now used to stipulate therein which identification for a routing topology and hence which routing table is intended to be used for forwarding the data packet DP. The extension header E therefore contains one of the identifications ID1 to ID5. Which identification and hence which routing table is used has been stipulated by the source node for the data packet DP. In contrast to conventional routing methods, the source node is therefore provided with the option of forwarding the data packets on different paths, for example when failure of a network node in the data network occurs.

Figure 8:
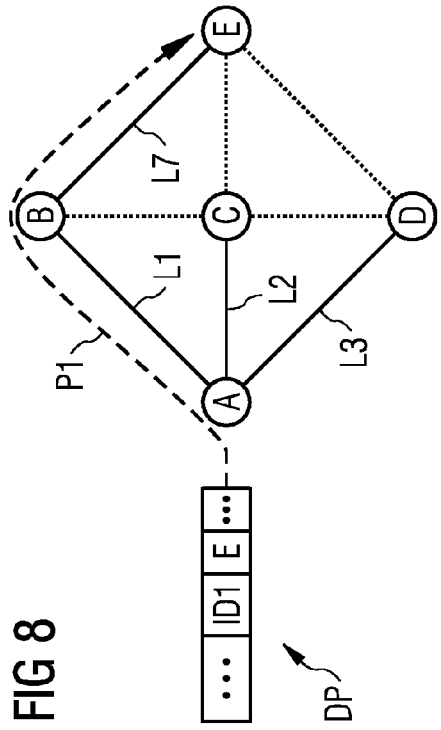
FIGS. 8-10 depict different embodiments of transmission paths determined on the basis of an identification in a data packet to be transmitted.
Figure 9:
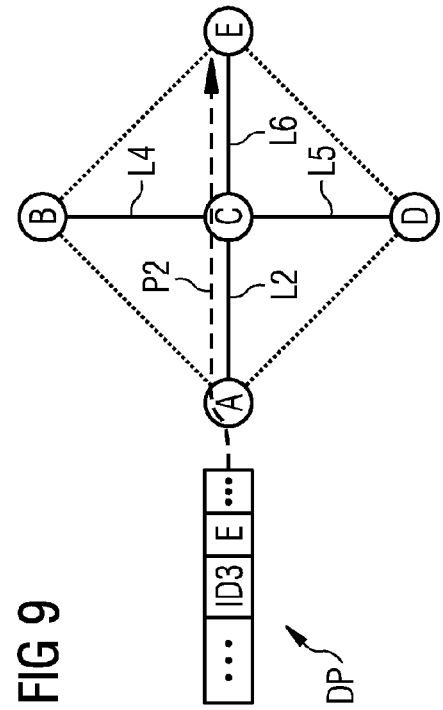
Figure 10:
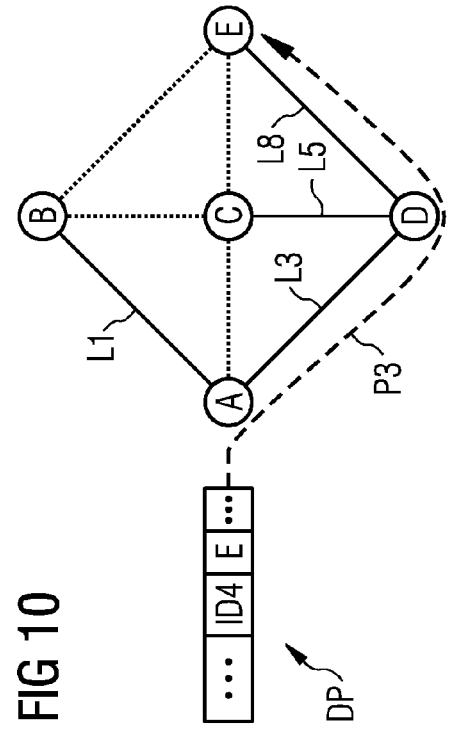

FIGS. 8-10 clarify transmission of a data packet DP from node A to node E using various routing topologies from FIGS. 1-6. All the data packets DP in FIG. 8 to FIG. 10 contain the destination address of the node E, but differ in terms of their identifications in the extension header. As shown in FIG. 8, the data packet is transmitted on the basis of the routing topology RT1, indicating that the links L1 and L7 are used as transmission path P1. By contrast, as shown in FIG. 9, in which the routing topology with the identification ID3 is specified, the data packets are routed from node A via the path P2, which contains the links L2 and L6. For the data packet in FIG. 10, which contains the identification ID4, the data transmission is affected on the basis of the path P3, which includes the links L3 and L8.

As already mentioned above, the various switching topologies may be used in order to quickly switch to an alternative intact path in the event of a link failure. To this end, the routing along those routing topologies that contain the affected link needs to be replaced by another spanning tree that does not contain the link. Failure of the link L2 in the data network DN in FIG. 1 may potentially affect the routing with the routing topologies RT1 to RT3, for example, since these contain the link L2. In this case, the use of a plurality of routing topologies may prevent forwarding via failed links. If the aim is for a data packet DP initially to be transmitted to node E on the basis of FIG. 9, for example, the failure of the link L2 indicating that not the routing topology ID3 but rather, by way of example, the routing topology with the identification ID4 from FIG. 10 is used, since in that case the link L2 is not contained in the transmission path in the case of transmission to node E.

In the routing topology described with reference to FIGS. 1-6, each link does not occur in at least one routing topology, indicating that the rapid restoration of traffic is allowed for each link error. This is not necessarily valid for all the topologies, however. However, possibly further routing topologies may be introduced when a link is contained in all the ascertained routing topologies. The determination of a further routing topology is described below with reference to FIGS. 11-16.

Figure 11:
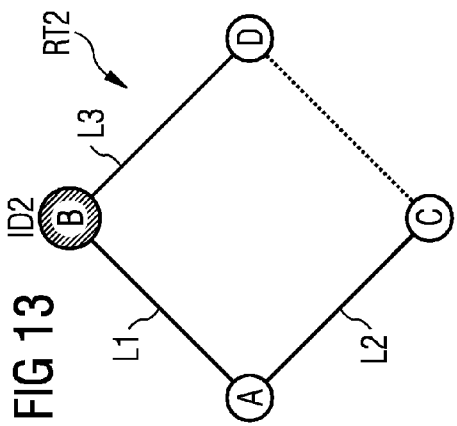
FIG. 11 depicts a schematic illustration of another embodiment of a data network.
Figure 12:
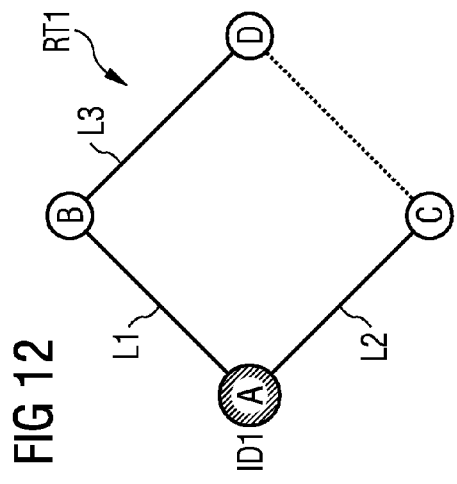
FIGS. 12-15 depict various routing topologies that are determined on the basis of the data network depicted in FIG. 11.
Figure 13:
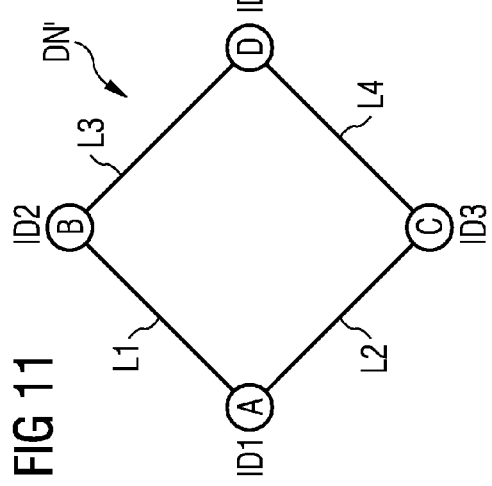
Figure 14:
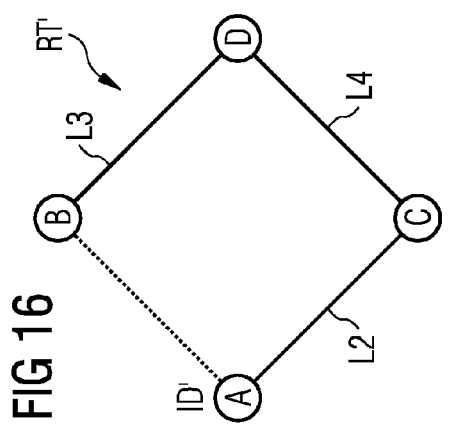
Figure 15:
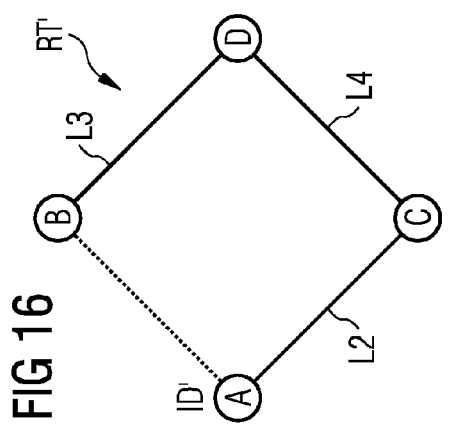

FIG. 11 shows a variant of a data network DN' that contains four network nodes A to D and corresponding links L1, L2, L3, and L4 between the nodes. In the same way as has been described with reference to FIGS. 1-6, appropriate routing topologies RT1 to RT4 are now determined for each node of the plurality of nodes A to D on the basis of the OSPF method, as may be seen from FIGS. 12-15. In addition, a routing table is generated for each routing topology in each node of the plurality of nodes A to D, so that forwarding of data packets is made possible by various routing topologies. In contrast to the scenario in FIGS. 1-6, each routing topology of the plurality of routing topologies RT1 to RT4 now contains the link L1.

Figure 16:
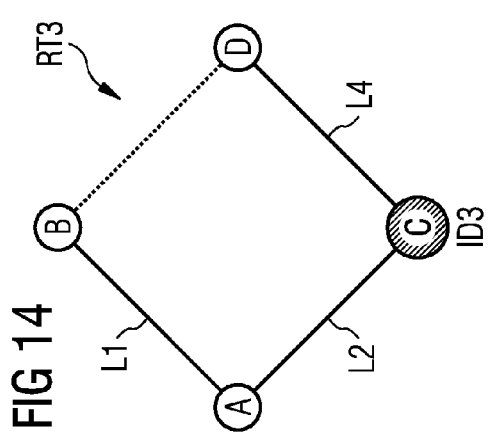
FIG. 16 depicts an embodiment of a routing topology that is additionally determined for the data network depicted in FIG. 11 on the basis of the fact that a link occurs in all the routing topologies depicted in FIGS. 12-15.

In order for data packets to be forwarded in the event of failure of the link L1, a further routing topology RT' as shown in FIG. 16 is produced that no longer contains the link L1. This is indicated in FIG. 16 by the fact that the link L1 is reproduced in dashes, which is synonymous with the link L1 not being existent. The routing topology RT' is associated with one of the nodes that are terminal points of the link L1, with node A being used in the example described here, since the identification ID1 of its routing topology RT1 has a smaller value than the identification ID2 of the routing topology RT2, which identification is associated with node B. For node A, a routing table is then in turn determined on the basis of the topology in FIG. 16 in a manner known per se. Similarly, corresponding routing tables are also calculated for the other nodes B to D from the point of view of these nodes on the basis of the routing topology RT'. Therefore, each network node of the plurality of network nodes A to D stores a further routing table with the relevant identification ID' of the routing topology RT'. This further routing table may also be used for forwarding data packets. The further routing topology RT' now no longer contains the link L1, meaning that, in the event of failure of this link, specification of the identity ID' in the relevant data packet DP allows the data packet to be forwarded via links other than the failed link L1.

In the scenarios in FIGS. 1-6 and FIGS. 11-16, routing topologies have been considered for each network node in the data network. With a large number of network nodes, this may result in scalability problems on account of the large volume of routing topologies calculated. In one embodiment, this is avoided by calculating a routing topology not for each node but rather just for each $x^{th}$ node (x>1). By way of example, this may be accomplished by ascertaining the remainder of the integer division of an identification of the node by the value x and initiating the relevant routing topology with the determinations of the routing tables that are based thereon for a remainder of zero. In this case, the identification of the node may correspond to the above-described identification of the associated routing topology, with the identifications in this case being allocated independently of whether the routing topology is actually ascertained.

The embodiments described above have a series of advantages. In particular, one advantage is a simple matter to generate a plurality of routing topologies with appropriate routing tables in comparison with a single spanning tree in the case of conventional routing. This allows flexible forwarding of data packets along different paths. Furthermore, rapid switching in the event of a link error occurring is possible. The required extensions in comparison with conventional OSPF routing are the allocation of explicit identifiers for relevant nodes or associated routing topologies and also the definition of a data field in which the routing topology is specified in a data packet. The conventional algorithm for calculating shortest routing paths may be reused in this case.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present invention has been described above by reference to various embodiments, it should be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A method for transmitting data packets in a data network having a multiplicity of network nodes, the method comprising:
   a) ascertaining routing topologies for a respective network node in the data network, wherein the respective network node has an explicit identification, and wherein the routing topologies describe paths for forwarding data packets between the respective network node and other network nodes in the data network on the basis of links between adjacent network nodes;
   b) producing routing information with the explicit identification of the routing topologies that indicate the adjacent network nodes to which the data packet should be forwarded to be received at a destination network node, wherein the routing information is stored in the respective network node;
   c) transmitting the data packet from the respective network node to the destination network node, wherein the data packet specifies the explicit identification of the routing topology to be used, and wherein each network node that forwards the data packet uses the routing information with the explicit identification of the routing topologies for the data packet; and
   in the event of a link occurring in all the routing topologies in the ascertaining, for a network node of the link:
      ascertaining a further routing topology having an additional explicit identification that does not contain the link, wherein the further routing topology describes paths for forwarding data packets between one network node of the link and the other network nodes in the data network on the basis of links between the adjacent network nodes; and
      producing additional routing information with the additional explicit identification of the further routing topology, wherein the additional routing information is stored in the respective network node and wherein the data packet can also specify the further routing topology to be used in the transmitting.

2. The method as claimed in claim 1, wherein in the data network the data packets are transmitted on a L3 layer and on a basis of an Internet protocol.

3. The method as claimed in claim 1, wherein the data packet is transmitted on the basis of Internet protocol version 6 (IPv6), and the explicit identification of the routing topologies is specified in an extension header.

4. The method as claimed in claim 3, wherein the extension header is a hop-by-hop options extension header.

5. The method as claimed in claim 1, wherein the ascertaining of the routing topologies are on the basis of the Open Shortest Path First (OSPF) method.

6. The method as claimed in claim 1, wherein the ascertaining of the routing topologies comprises, in the event of a plurality of different paths for forwarding data packets between the respective network node and a particular other network node being able to be determined, a predetermined criterion that is the same for additional routing topologies to be ascertained being taken as a basis for stipulating one of the plurality of paths as part of the routing topology.

7. The method as claimed in claim 6, wherein identifications of the additional routing topologies are values from an ordinal scale and the predetermined criterion is embodied such that the plurality of different paths from the respective network node to the particular other network node run through in the same direction,
wherein the plurality of different paths are compared with each another, and
wherein the occurrence of at least partially different network nodes involves the path with that network node from the at least partially different network nodes that has the associated routing topology with the smallest or largest identification being stipulated as part of the routing topology.

8. The method as claimed in claim 1, wherein the ascertaining is performed for all of the multiplicity of network nodes in the data network.

9. The method as claimed in claim 1, wherein the ascertaining is performed for some of the multiplicity of network nodes in the data network.

10. The method as claimed in claim 9, wherein each of the multiplicity of network nodes comprise an identification of a routing topology forming a number of identifications, in which the identifications are successive integers excluding zero,
wherein, for each of the multiplicity of network nodes in the data network, the identification of the routing topology is stipulated independently of whether the routing topology is ascertained for a selected network node, the identifications being divided on an integer basis by a prescribed integer excluding zero, and the routing topology being ascertained for the respective network node for a remainder of zero.

11. The method as claimed in claim 1, wherein, in the event of one or more links between adjacent network nodes in the data network having failed or having an inadequate transmission quality on the basis of one or more quality criteria, a source network node specifies, in the data packet to be transmitted, a separate identification of a separate routing topology that does not contain any of the failed links or the links with inadequate transmission quality.

12. A data network comprising:
a multiplicity of network nodes for transmitting data packets, wherein the network nodes are each configured to:
a) ascertain routing topologies for a respective network node in the data network, wherein the respective network node has an explicit identification, and wherein the routing topologies describe paths for forwarding data packets between the respective network node and other network nodes in the data network on the basis of links between adjacent network nodes;
b) produce routing information with the explicit identification of the routing topologies that indicate the adjacent network nodes to which the data packet should be forwarded to be received at a destination network node, wherein the routing information is stored in the respective network node;
c) transmit the data packet from the respective network node to the destination network node, wherein the data packet specifies the explicit identification of the routing topology to be used, and wherein each network node that forwards the data packet uses the routing information with the explicit identification of the routing topologies for the data packet; and
in the event of a link occurring in all the routing topologies in the ascertainment of the routing topologies, for a network node of the link:
ascertain a further routing topology having an additional explicit identification that does not contain the link, wherein the further routing topology describes paths for forwarding data packets between one network node of the link and the other network nodes in the data network on the basis of links between the adjacent network nodes; and
produce additional routing information with the additional explicit identification of the further routing topology, wherein the additional routing information is stored in the respective network node, and wherein the data packet can also specify the further routing topology to be used in the transmitting.

13. The data network as claimed in claim 12, wherein the routing topologies are ascertained on the basis of the Open Shortest Path First (OSPF) method.

14. The data network as claimed in claim 12, wherein in the event of a plurality of different paths for forwarding data packets between the respective network node and a particular other network node being able to be determined, a predetermined criterion that is the same for additional routing topologies to be ascertained being taken as a basis for stipulating one of the plurality of paths as part of the routing topology.

15. The data network as claimed in claim 14, wherein identifications of the additional routing topologies are values from an ordinal scale, and the predetermined criterion is embodied such that the plurality of different paths from the respective network node to the particular other network node run through in the same direction,
wherein the plurality of different paths are compared with each another, and
wherein the occurrence of at least partially different network nodes involves the path with that network node from the at least partially different network nodes that has the associated routing topology with the smallest or largest identification being stipulated as part of the routing topology.

16. The data network as claimed in claim 12, wherein each of the multiplicity of network nodes comprise an identification of a routing topology forming a number of identifications, in which the identifications are successive integers excluding zero, wherein, for each of the multiplicity of network nodes in the data network, the identification of the routing topology is stipulated independently of whether the routing topology is ascertained for a selected network node, the identifications being divided on an integer basis by a prescribed integer excluding zero, and the routing topology being ascertained for the respective network node for a remainder of zero.

17. The data network as claimed in claim 12, wherein, in the event of one or more links between adjacent network nodes in the data network having failed or having an inadequate transmission quality on the basis of one or more quality criteria, a source network node specifies, in the data packet to be transmitted, a separate identification of a separate routing topology that does not contain any of the failed links or the links with inadequate transmission quality.

18. A network node for transmitting data packets, wherein the network node is configured to:

a) ascertain routing topologies for the network node in a data network, wherein the network node has an explicit identification, and wherein the routing topologies describe paths for forwarding data packets between the network node and other network nodes in the data network on the basis of links between adjacent network nodes;

b) produce routing information with the explicit identification of the routing topologies that indicate the adjacent network nodes to which the data packet should be forwarded to be received at a destination network node, wherein the routing information is stored in the network node;

c) transmit the data packet from the network node to the destination network node, wherein the data packet specifies the explicit identification of the routing topology to be used, and wherein each network node that forwards the data packet uses the routing; and information with the explicit identification of the routing topologies for the data packet; and in the event of a link occurring in all the routing topologies in the ascertainment of the routing topologies, for a network node of the link:

ascertain a further routing topology having an additional explicit identification that does not contain the link, wherein the further routing topology describes paths for forwarding data packets between one network node of the link and the other network nodes in the data network on the basis of links between the adjacent network nodes; and produce additional routing information with the additional explicit identification of the further routing topology, wherein the additional routing information is stored in the respective network node, and wherein the data packet can also specify the further routing topology to be used in the transmitting.

* * * * *